(12) United States Patent
Oberlin et al.

(10) Patent No.: US 6,198,205 B1
(45) Date of Patent: Mar. 6, 2001

(54) ONE-SHOT HIGH-OUTPUT PIEZOID POWER SUPPLY

(76) Inventors: Richard P. Oberlin, 4101 Green Glade Rd., Phoenix, MD (US) 21131; Robert T. Soranno, 2806 Blythe Ct., Baldwin, MD (US) 21013-9551

( * ) Notice: Subject to any disclaimer, the term of this patent is extended or adjusted under 35 U.S.C. 154(b) by 0 days.

(21) Appl. No.: 09/376,534

(22) Filed: Aug. 18, 1999

Related U.S. Application Data

(63) Continuation-in-part of application No. 09/001,687, filed on Dec. 31, 1997.

(51) Int. Cl.⁷ ............................................. H01L 41/04
(52) U.S. Cl. ........................................................ 310/339
(58) Field of Search .................................... 310/329, 339

(56) References Cited

U.S. PATENT DOCUMENTS

| | | | |
|---|---|---|---|
| 3,211,069 | * | 10/1965 | Rixton . |
| 3,229,636 | * | 1/1966 | Mayo et al. . |
| 3,340,811 | * | 9/1967 | Gauld . |
| 3,438,326 | * | 4/1969 | Thomanek et al. . |
| 3,466,473 | * | 9/1969 | Rhoten . |
| 3,624,451 | * | 11/1971 | Gauld . |
| 3,967,141 | * | 6/1976 | Gawlick et al. . |
| 4,176,608 | * | 12/1979 | Ambrosini et al. . |
| 4,581,506 | * | 4/1986 | Bai et al. . |
| 5,065,067 | * | 11/1991 | Todd et al. . |
| 5,341,062 | * | 8/1994 | Cero, Jr. et al. . |
| 5,435,248 | * | 7/1995 | Rode et al. .......................... 102/210 |

* cited by examiner

*Primary Examiner*—Nestor Ramirez
*Assistant Examiner*—Peter Medley
(74) *Attorney, Agent, or Firm*—Venable; James R. Burdett

(57) ABSTRACT

A piezoid power supply used to supply power to the electronics located in a fast moving projectile which contains a programmable projectile fuze contains multiple layers of piezoid bulk material. By using multiple layers of piezoid bulk material, instead of just one layer, the capacitance of the piezoid is increased. As a result, less energy is lost when the piezoid energy is transferred to the fuze electronics. In addition, by applying a setback force to the piezoid of such magnitude that the piezoid operates in the nonlinear region, the energy output from the piezoid is increased even more. By both incorporating a multitude of very thin layers in a piezoceramic and over-stressing the piezoid into the depolarization region, an improvement of almost three orders of magnitude in energy generation from set-back force is realized when compared to operation in the linear region.

13 Claims, 4 Drawing Sheets x's = MEASURED POINTS

MULTILAYER PIEZOID POWER SUPPLY

ONE-SHOT HIGH-OUTPUT PIEZOID POWER SUPPLY

CROSS REFERENCE TO RELATED APPLICATIONS

This application is related to the following applications: "Ultra Low-Power Fast Start Precision Oscillator" U.S. Ser. No. 09/001,690 by Richard P. Oberlin; "Muzzle Velocity Sensor" U.S. Ser. No. 09/001,694 by Richard P. Oberlin and Doug R. Cullison; "Accurate Ultra Low-Power Fuze Electronics" U.S. Ser. No. 09/002,247 by Richard P. Oberlin and Robert T. Soranno; "Self Correcting Inductive Fuze Setter" U.S. Ser. No. 09/001,693 by Richard P. Oberlin and Robert T. Soranno; and "Piezoid Electrical Gun Trigger" U.S. Ser. No. 09/001,688 by Richard P. Oberlin, each of which is filed concurrently herewith, commonly owned, and incorporated herein by reference. This application is a continuation-in-part of Application No. 09/001,687 filed in the names of Richard P. Oberlin and Robert T. Soranno on Dec. 31, 1997, entitled ONE-SHOT HIGH-OUTPUT PIEZOID POWER SUPPLY, the subject matter of which is incorporated herein by reference.

BACKGROUND OF THE INVENTION

The present invention relates to a new and improved piezoid power supply that can supply power to the electronics located in a fast moving projectile which contains a programmable projectile fuze.

Piezo devices have been used for years as power supplies for various applications, including fuzes. When used in fuzes, the detonation energy required has been generated on set back and then used at the desired detonation time, usually from an impact switch. The energy generated by the piezoid in this way is dependent on only two parameters: (1) the specific material used; and (2) the compressive setback pressure applied. It does not depend on how many layers of bulk piezo material are used or on how these layers are interconnected.

Typically, the piezo energy source is made from one layer of a bulk piezo material, has a capacitance, $C_P$, in the tens of pF's, and a relatively high voltage, $V_g$, in the low hundreds of volts. The generated energy, $E_g$, is thus given by the equation:

$$E_g = \frac{1}{2} * C_P * V_g^2$$

Next, the energy to be used for detonation is usually transferred to a storage capacitor, $C_s$. The stored capacitor energy, $E_s$, is given by the equation:

$$E_s = \frac{1}{2} * C_S * V_S^2$$

A substantial loss of generated energy occurs as a result of this transfer, but this loss is kept to a minimum if the storage capacitance and the capacitance of the piezoid are equal. In that case, 25% of the energy ends up in each capacitor and 50% is lost. This is illustrated in FIG. 2 where loss is plotted versus capacitance ratio.

The above arrangement works fine for detonator applications, since a detonator's response depends on the input energy and is unaffected by variations in capacitor voltage, i.e., whether a low or a high supply voltage is used. Therefore, it works well with the high voltage and low capacitance of a typical bulk piezoid.

On the other hand, the same is not true for the electronics used in a fuze. It is necessary to operate fuze electronics at low voltages. A typical range is 2.7 volts to 5.0 volts. This voltage range is much lower than voltages normally generated by piezoid power supplies.

A DC/DC converter cannot be used to reduce the piezoid power supply voltages to an acceptable level because none are available that can operate at voltages above 12 volts. Furthermore, a capacitor cannot be used to reduce the piezoid voltage to an acceptable level because too much energy loss occurs as a result of this transfer. By using a storage capacitor with a capacitance much greater than the piezoid capacitance, the piezoid voltage can be reduced to an acceptable level. However, although the voltage level is reduced to an acceptable level, the energy loss is so great (see FIG. 2), that only enough energy is left to power the electronics for a few hundred milliseconds.

Therefore, no previously known prior art devices involving piezoid power supplies can be used to power the fuze electronics located on a fast moving projectile.

SUMMARY OF THE INVENTION

It is a primary object of this invention to produce a new and improved piezo power supply which can supply power to a low power electronic fuze circuit for a substantial period of time.

Yet another and more specific object of the invention is to provide a new and improved piezoid power supply with increased capacitance and decreased output voltage.

Yet still another significant object of the invention is to provide a new and improved piezoid power supply which does not use a battery.

A fourth object of the invention is to provide a new and improved low cost piezoid power supply which occupies a small volume, can operate in a high "g" environment, and has a long shelf life.

A fifth object of the invention is to provide a new and improved piezoid power supply with simplified activation upon firing, which eliminates the need to precharge a capacitor, and which can double as an impact sensor, and thereby reducing component count.

A sixth object of the invention is a new and improved piezoid power supply with improved safety. The piezoid power supply according to the present invention will not generate any energy unless it is subjected to accelerations of 30,000 "g's" or more. In addition, it will automatically discharge if no detonation takes place.

Finally, a seventh object of the invention is that it compensates for the relatively slow start-up/stabilization of a voltage regulating DC/DC converter by splitting off some of the storage capacitor energy to one or more speed-up capacitors to act as temporary, instantaneous regulators.

The invention will be better understood and objects other than those set forth above will become apparent when consideration is given to the following detailed description thereof. Such description makes reference to the annexed drawings wherein throughout the various figures of the drawings, there have been generally used the same reference terminology to denote the same or analogous components and specifically wherein:

DETAILED DESCRIPTION OF THE PREFERRED EMBODIMENTS

In a piezoid power supply, the piezoid voltage, $V_g$, is given by the equation:

$$V_g = P * t * G_{33},$$

where P=pressure, t=thickness and $G_{33}$=piezo constant. The piezo capacitance is given by the equation:

$$C_P = (K*A/t)*(h/t),$$

where K=dielectric constant, A=area, h=height and h/t=the total number of piezoid layers. Finally, the energy generated by the piezoid, $E_g$, is given by the equation:

$$E_g = \tfrac{1}{2} C_P * V_g^2.$$

The pressure, P, the area, A, and the height, h, are considered fixed by the geometry of the specific situation and both $G_{33}$ and K are fixed by the piezo material selected. Therefore, the only arbitrarily adjustable variable is the layer thickness.

Combining terms in the equation for piezo capacitance as above yields:

$$C_P = K*A*(h/t^2)$$

Substituting this equation, and the piezoid voltage equation into the equation for $E_g$ produces:

$$E_g = (\tfrac{1}{2})*(K*A*h/t^2)*(P*t*G_{33})^2,$$

or $$E_g = (\tfrac{1}{2})*K*A*h*P^2*G_{33}^2.$$

It can be seen from the above equations that although energy generated by the piezoid is independent of thickness as noted immediately herein above, the piezoid voltage is reduced as thickness is increased and piezoid capacitance increases as the square of decreasing thickness.

Thus, the thinner the layers of bulk piezo material are, the higher the piezo capacitance. Furthermore, if the layer thickness could be reduced enough (in a given volume) to achieve the total desired capacitance required for energy storage in the piezoid alone, then there will be no transfer loss and 100% of the energy generated by the piezoid will be available to the fuze electronics.

Figure 2:
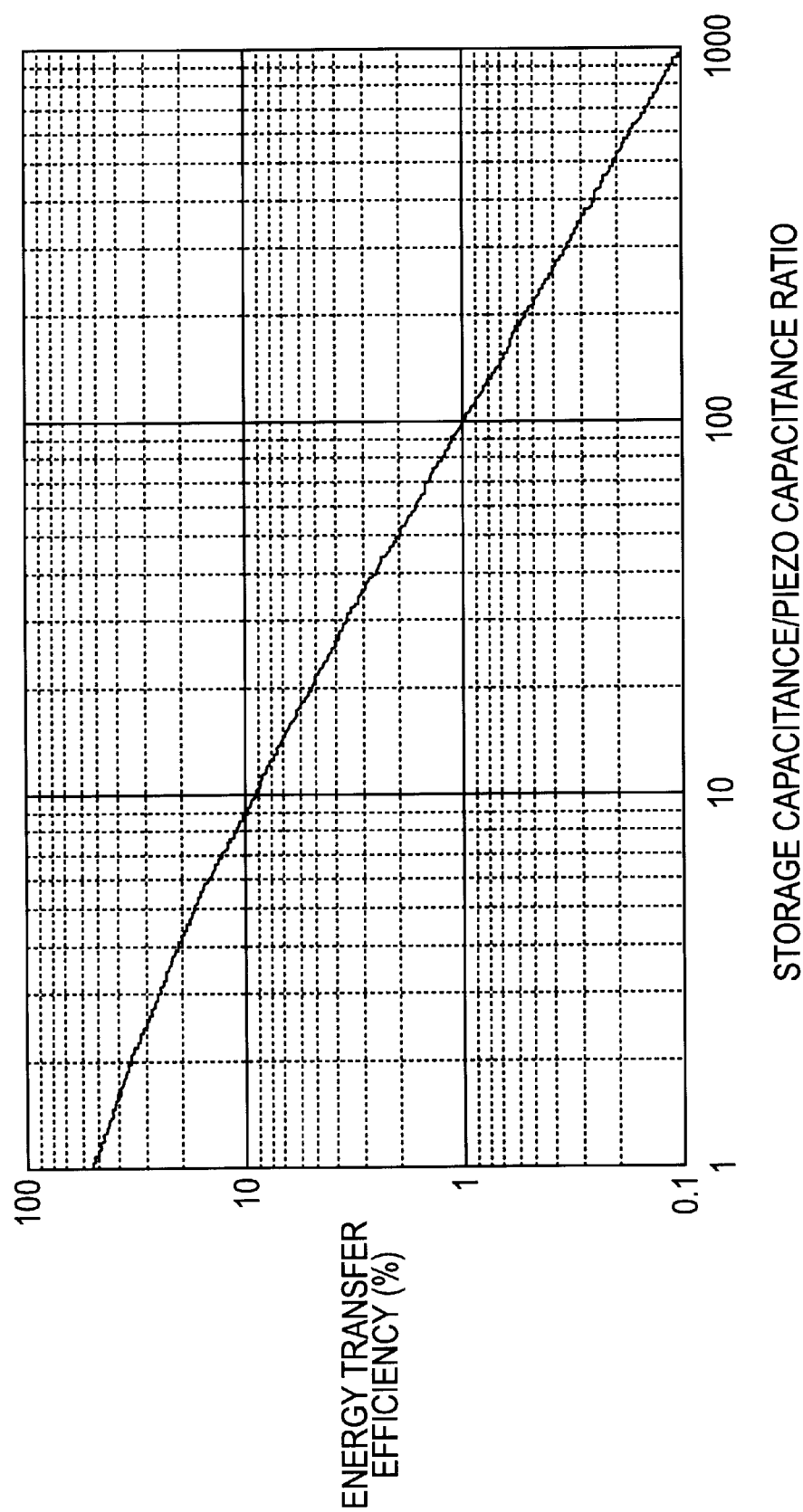
FIG. 2 is a plot of energy transfer efficiency versus the ratio of storage capacitance/piezo capacitance.

An example case shows the benefit of the multi-layer stack over a single crystal. If a piezoid power supply 0.13" by 0.13" by 0.156" high of PZT-5A piezo bulk material were subjected to 28,800 psi of pressure at −40° C., the piezoid would generate 77,400 ergs of energy. This piezoid crystal would have a capacitance of 30 pF and require a storage capacitance of 0.06 uF to bring the voltage down to 11.5 volts. The resulting stored energy which is then available to the fuze electronics is then only 39 ergs (the transfer efficiency being extrapolated to 0.05% from FIG. 2 with a 2000:1 capacitance ratio.

In comparison to the single crystal, a multi-layer piezoid with a layer thickness of 0.81 mils (a standard available configuration) would result in 186 layers and a piezoid capacitance of 1 uF. This would require a storage capacitance of 10 uF to pull the output voltage down to 11.5 volts. The resulting stored energy available to power the fuse is 7,300 ergs at −40° C., an improvement over a single crystal of almost 200 to 1. This is due to the reduction of the capacitance ratio to 10, which results in a transfer efficiency of 9% (see FIG. 2).

Figure 1:
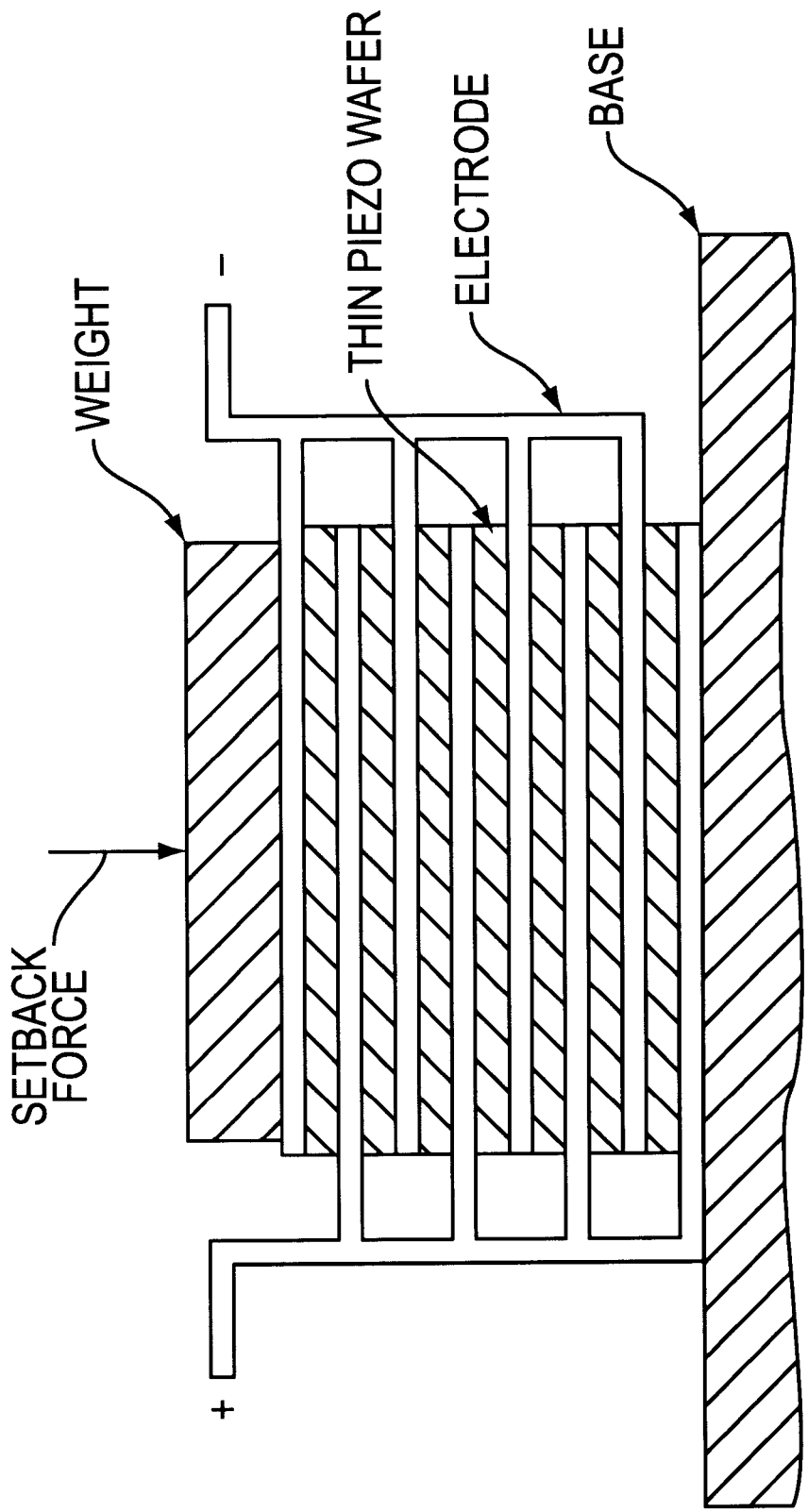
FIG. 1 is a drawing of a multi-layer piezoid power source.

Thus, by using multiple layers of bulk piezo material to fabricate a piezoid power supply (this arrangement is shown in FIG. 1), the piezoid capacitance is increased dramatically. The energy generated in a piezoid power supply, $E_g$, is given by $E_g = \tfrac{1}{2} * C_P * V_g^2$, (where $C_P$=the piezoid capacitance and $V_g$=the piezoid voltage). Therefore, if the capacitance is increased, the supply voltage will be decreased for a given amount of energy. As a result, greater energy storage is obtainable at lower voltages.

NON-LINEAR OPERATION

Figure 3:
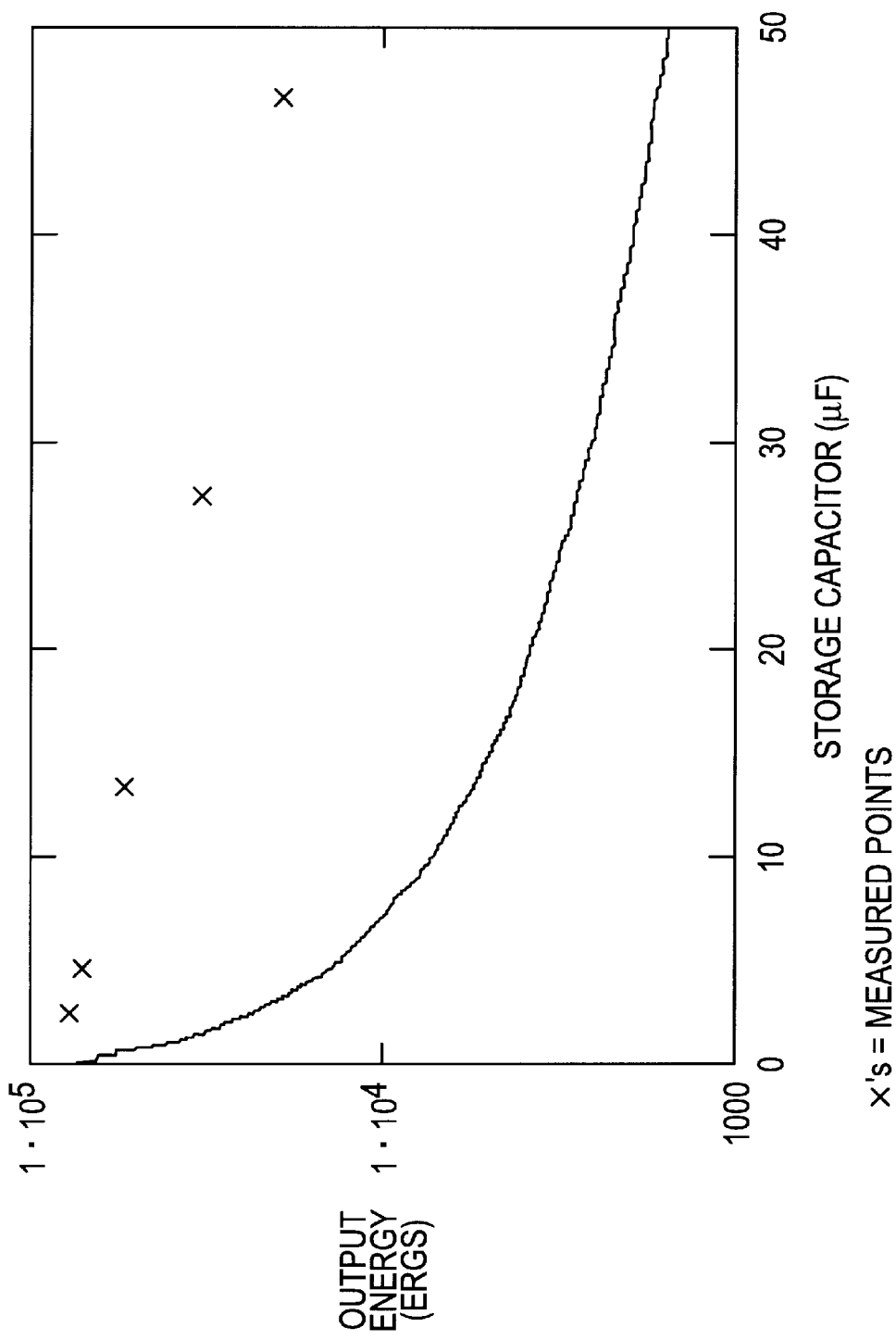
FIG. 3 is a plot of output energy versus storage capacitance for a piezo crystal in the nonlinear region.

Normally, piezoid devices are operated in their linear region, which means that forces or voltages are limited so that no depolarization takes place, and the piezoelectric constants such as $G_{33}$ and the dielectric constant K remain at their published values from one activation of the piezoid to another. However, by increasing the pressure sufficiently (but still within the comprehensive strength of the piezoid material), the piezoid can be depolarized and there by made to give up much of this polarization energy. In a preferred embodiment, the result is an energy generation whose output is typically 5 to 10 times greater than that calculated for operation in the linear region. This improvement is shown in FIG. 3 where energy output is plotted against different storage capacitor values.

For example, if a 0.13" by 0.13" by 0.156" high of PZT-5A piezo bulk material were subjected to forces discussed above, 24,800 ergs would be made available at −40° C. with a storage capacitor size of 39 uF. This compares again to 39 ergs with a conventional single layer crystal of the same dimensions. The only drawback in using this process is that the crystal can only be over-stressed once, but this is quite satisfactory in fuze applications.

Figure 4:
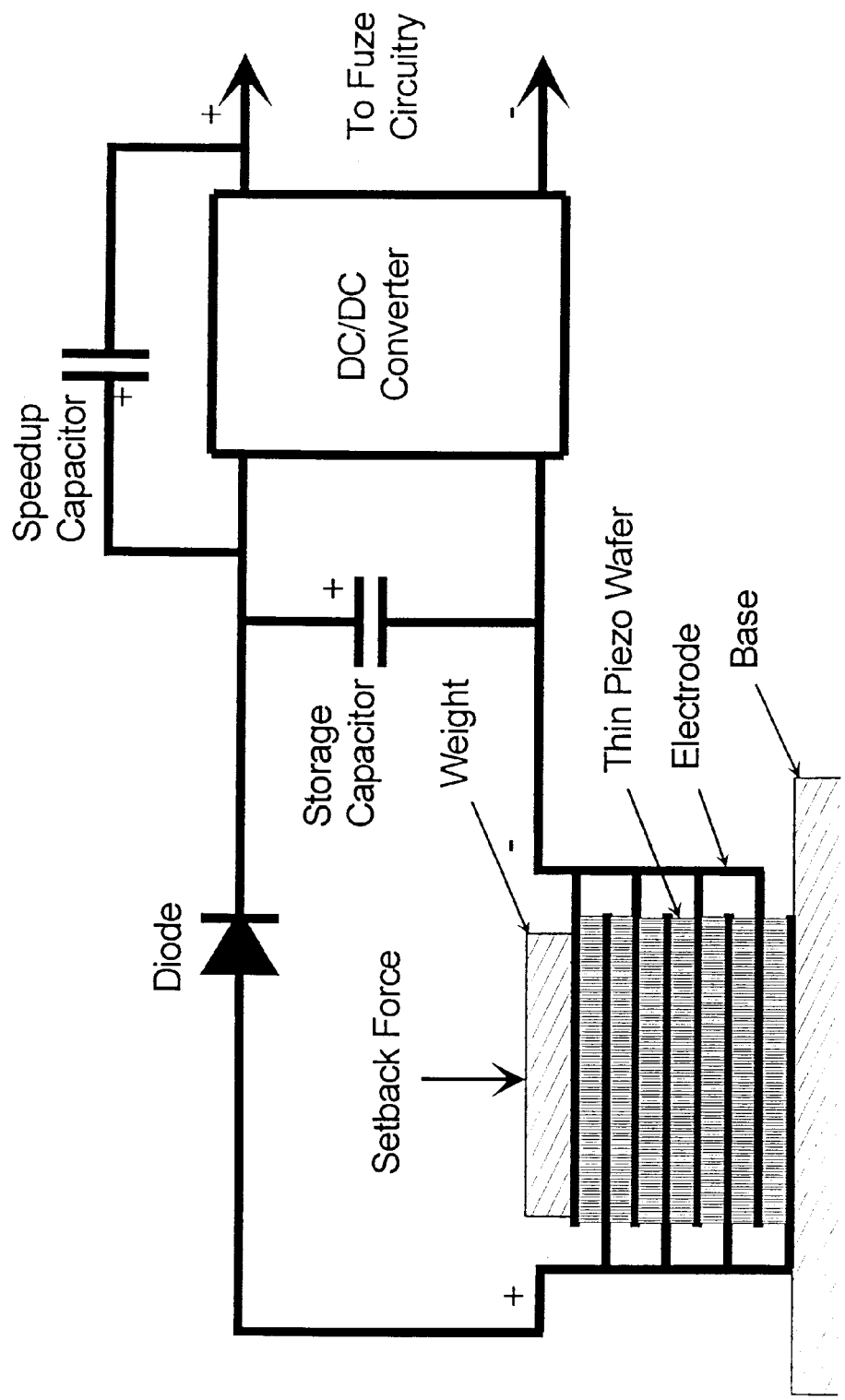
FIG. 4 is a high level diagram of the one-shot high-output piezoid power supply circuit.

By both incorporating a multitude of very thin layers in a piezoceramic and over-stressing the piezoid into the depolarization region, an improvement of almost three orders of magnitude in energy generation from set-back force is realized when compared to the energy generated by a single layer piezoid with the same overall dimensions. The one-shot high-output piezoid power supply circuit depicted in FIG. 4 is designed to take advantage of this phenomenon. During setback, the storage capacitor is able to accept and store the maximum energy from the piezoid. It is sized so as not to store and provide a higher voltage than the maximum input voltage than the DC/DC converter can handle. Alternatively the DC/DC converter can provide voltage limiting or commonly known external circuitry/components can be added to limit the voltage. Simultaneously, the speed-up capacitor is draining some energy in order to provide the required voltage to the fuze circuitry, so that its start-up time is only a function of the limitations of the slowest active component in the circuit. Once the DC/DC converter stabilizes, it takes over as the fuze power source and is powered by the storage capacitor. The diode ensures that all of the energy is transferred in the direction of the storage capacitor. The diode has a first terminal and a second terminal. The first terminal of the diode is an anode and is connected and electrically coupled to the positive electrode of the piezoid power supply. The second terminal of the diode is a cathode. The storage capacitor has a first terminal and a second terminal. The first terminal of the storage capacitor is connected and electrically coupled to the second terminal of the diode and the second terminal of the storage capacitor is connected and electrically coupled to the negative electrode of the piezoid power supply. The DC/DC converter has a first terminal, a second terminal, a third terminal and a fourth terminal. The first terminal of the DC/DC converter is connected and electrically coupled to the second terminal of the diode and the first terminal of the storage capacitor. The second terminal of the DC/DC converter is connected and electrically coupled to the second terminal of the storage capacitor and the negative electrode of the piezoid power supply. The third terminal of the DC/DC converter is connected and electrically coupled to a positive output. The fourth terminal of the DC/DC converter is connected and electrically coupled to a negative output. The speed-up capacitor has a first terminal and a second terminal. The first terminal of the speed-up capacitor is connected and electrically coupled to the second terminal of the diode, the first terminal of the storage capacitor and the first terminal of the DC/DC converter. The second terminal of the speed-up capacitor is connected and electrically coupled to the positive output and the third terminal of the DC/DC converter. This invention, therefore, makes possible the practical use of a piezoid to power a smart fuze and to eliminate the need for pre-charging or the use of batteries.

While there are shown and described present preferred embodiments of the invention, it is distinctly understood that the invention is not limited thereto, but may be otherwise variously embodied and practiced within the scope of the following claims.

What is claimed is:

1. A piezoid power supply circuit, comprising:

a piezoid power supply having a plurality of extremely thin polarized piezo material, each of said layers of polarized piezo material positioned and electrically connected to a corresponding positive electrode and corresponding negative electrode, a base positioned beneath and electrically coupled to the outermost positive electrode, a weight positioned on top of and electrically connected to said outermost negative electrode, all of said positive electrodes connected and electrically coupled to each other and all of said negative electrodes connected and electrically coupled to each other;

a diode having a first terminal and a second terminal, said first terminal being connected and electrically coupled to said positive electrode of said piezoid power supply;

a storage capacitor having a first terminal and a second terminal, said first terminal of said storage capacitor being connected and electrically coupled to said second terminal of said diode and said second terminal of said storage capacitor being connected and electrically coupled to said negative electrode of said piezoid power supply;

a DC/DC converter having a first terminal, a second terminal, a third terminal and a fourth terminal, said first terminal of said DC/DC converter being connected and electrically coupled to said second terminal of said diode and said first terminal of said storage capacitor, said second terminal of said DC/DC converter being connected and electrically coupled to said second terminal of said storage capacitor and said negative electrode of said piezoid power supply, said third terminal of said DC/DC converter being connected and electrically coupled to a positive output, said fourth terminal of said DC/DC converter being connected and electrically coupled to a negative output;

a speed-up capacitor having a first terminal and a second terminal, said first terminal of said speed-up capacitor being connected and electrically coupled to said second terminal of said diode and said first terminal of said storage capacitor and said first terminal of said DC/DC converter, said second terminal of said speed-up capacitor being connected and electrically coupled to said positive output and said third terminal of said DC/DC converter.

2. The piezoid power supply circuit according to claim 1, wherein said piezoid power supply is sized to produce the maximum energy when a setback force sufficient to cause said piezoid power supply to operate so far into its non-linear region as to be depolarized is applied.

3. The piezoid power supply circuit according to claim 2, wherein said storage capacitor is sized to accept and store the maximum positive energy, within the voltage limits of the DC/DC converter, from said piezoid operated in its depolarized non-linear range.

4. The piezoid power supply circuit according to claim 3, wherein said speed up capacitor is sized to deliver the required energy to a programmable fuze to bring it up operating voltage while the DC/DC converter is stabilizing.

5. The piezoid power supply circuit according to claim 4, wherein said speed up capacitor is sized to deliver the required energy to a programmable fuze to bring it up operating voltage while the DC/DC converter is stabilizing in order to reduce the start-up time for said fuze.

6. A piezoid power supply circuit for powering a programmable fuze, comprising:

a piezoid power supply having a plurality of extremely thin polarized piezo material, each of said layers of polarized piezo material positioned and electrically connected to a corresponding positive electrode and corresponding negative electrode, a base positioned beneath and electrically coupled to the outermost positive electrode, a weight positioned on top of and electrically connected to said outermost negative electrode, all of said positive electrodes connected and electrically coupled to each other and all of said negative electrodes connected and electrically coupled to each other;

a diode having a first terminal and a second terminal, said first terminal being connected and electrically coupled to said positive electrode of said piezoid power supply;

a storage capacitor having a first terminal and a second terminal, said first terminal of said storage capacitor being connected and electrically coupled to said second terminal of said diode and said second terminal of said storage capacitor being connected and electrically coupled to said negative electrode of said piezoid power supply;

a DC/DC converter having a first terminal, a second terminal, a third terminal and a fourth terminal, said first terminal of said DC/DC converter being connected and electrically coupled to said second terminal of said diode and said first terminal of said storage capacitor, said second terminal of said DC/DC converter being connected and electrically coupled to said second terminal of said storage capacitor and said negative electrode of said piezoid power supply, said third terminal of said DC/DC converter being connected and electrically coupled to a positive output, said fourth terminal of said DC/DC converter being connected and electrically coupled to a negative output;

a speed-up capacitor having a first terminal and a second terminal, said first terminal of said speed-up capacitor being connected and electrically coupled to said second terminal of said diode and said first terminal of said storage capacitor and said first terminal of said DC/DC converter, said second terminal of said speed-up capacitor being connected and electrically coupled to said positive output and said third terminal of said DC/DC converter.

7. The piezoid power supply circuit according to claim 6, wherein said piezoid power supply is sized to produce the maximum energy when a setback force sufficient to cause said piezoid power supply to operate so far into its non-linear region as to be depolarized is applied.

8. The piezoid power supply circuit according to claim 7, wherein said storage capacitor is sized to accept and store the maximum positive energy, within the voltage limits of the DC/DC converter, from said piezoid operated in its depolarized non-linear range.

9. The piezoid power supply circuit according to claim 8, wherein said speed up capacitor is sized to deliver the required energy to a programmable fuze to bring it up operating voltage while the DC/DC converter is stabilizing.

10. The piezoid power supply circuit according to claim 9, wherein said speed up capacitor is sized to deliver the required energy to a programmable fuze to bring it up operating voltage while the DC/DC converter is stabilizing in order to reduce the start-up time for said fuze.

11. The piezoid power supply circuit according to claim 6, wherein said piezoid power supply is sized to produce the maximum energy when a setback force sufficient to cause said piezoid power supply to operate so far into its non-linear region as to be depolarized is applied thereby causing said piezoid power supply to be over-stressed.

12. The piezoid power supply circuit according to claim 6, wherein said piezoid power supply further functions as an impact sensor.

13. The piezoid power supply circuit according to claim 6, wherein said piezoid further will auto-discharge if no detonation takes place.

* * * * *